J. P. LIPPERT.
FLUID TRAP.
APPLICATION FILED JAN. 12, 1922.
1,420,045.
Patented June 20, 1922.
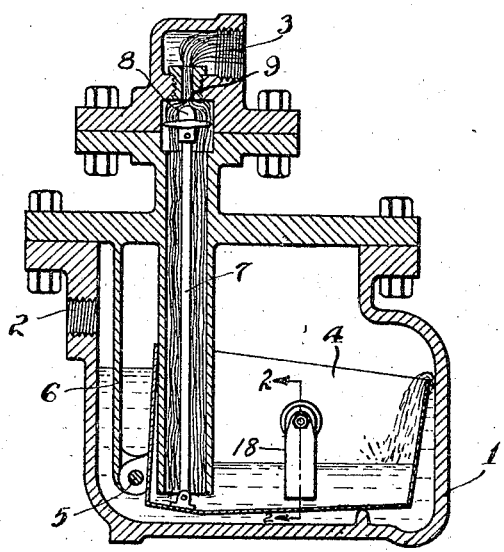
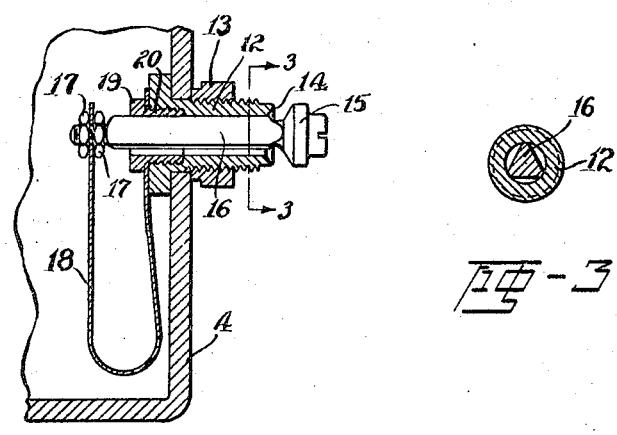

UNITED STATES PATENT OFFICE.

JOHN P. LIPPERT, OF EAST CLEVELAND, OHIO.

FLUID TRAP.

1,420,045.  Specification of Letters Patent.  Patented June 20, 1922.

Application filed January 12, 1922. Serial No. 528,663.

*To all whom it may concern:*

Be it known that I, JOHN P. LIPPERT, a citizen of the United States, residing at East Cleveland, in the county of Cuyahoga and State of Ohio, have invented a certain new and useful Improvement in Fluid Traps, of which the following is a full, clear, and exact description, reference being had to the accompanying drawings.

This invention relates to fluid traps and is directed more particularly to a trap of this nature which employs a swinging bucket for operating the discharge valve therein.

Fluid traps find a wide usage but probably are used most extensively in steam systems for removing the condensation therefrom.

The condensation drains into the body of the trap and the hinged bucket, being buoyant, floats and closes the discharge valve. As the condensation increases, the body of the trap fills and the water enters the bucket, causing it to sink. The bucket being attached to the discharge valve, opens it and the trap begins to discharge, continuing to do so until the condensation is blown out of the body to the lowest edge of the bucket, when the water in the bucket is forced out until the bucket again becomes buoyant, rises and closes the valve. This operation continues so long as air does not get into the system and cause what is commonly known as "binding." That is, when the body of the trap is filled with air instead of steam which often happens, then the discharge valve being closed and the bucket floating, condensation cannot enter in sufficient quantity to overbalance the bucket; hence, the trap fails to operate. It is exceedingly difficult to determine if a trap is operating properly as they are noiseless in operation and the discharge is usually piped to some distant and common discharge line, to which other traps are connected.

It is the principal object of the present invention to provide a fluid trap which shall eliminate binding and automatically restore operation of the trap.

Another object is to provide a simple and inexpensive arrangement for automatically sinking the bucket when binding occurs and thus place the trap in operation again.

With these and other objects in view, the invention consists of the novel features of construction and combination, all of which will be fully described hereinafter, and pointed out in the appended claims.

In the accompanying drawing wherein I have shown an illustrative embodiment of my invention, Fig. 1 is a vertical sectional view of a trap embodying my invention; Fig. 2 is an enlarged sectional view taken on the line 2—2 of Fig. 1; and Fig. 3 is a detail sectional view taken on the line 3—3 of Fig. 2.

Describing by reference characters the various parts illustrated, 1 indicates the body portion of a fluid trap which is provided with an inlet opening 2 and a discharge opening 3. A bucket 4 is hinged as indicated at 5 to a plate 6 depending into the body portion of said trap. Secured to the bucket is a valve stem 7 which carries a valve 8 at one end thereof and is adapted to engage a seat 9 to close the discharge opening.

In applying my invention to a trap of this general type, I fit the bucket 4 with a thermostatically controlled valve so that said valve will be positioned below the normal water level within the trap and when open, said valve will permit the water in the body portion of the trap to flow into the bucket and cause it to sink, thereby opening the discharge valve 8 and restoring the trap to normal operation.

A valve for accomplishing this result is shown in detail in Figs. 2 and 3 wherein 12 indicates a bushing secured in the wall of the bucket by a nut 13 threaded thereon. The exterior end of this bushing is formed with a seat 14 which cooperates with a valve 15 having a stem 16 projecting through said bushing. This valve stem is triangular in cross section as shown in Fig. 3 so as to form a guide for the valve 15. The inner end of valve stem 16 has fastened thereto by nuts 17, 17, a thermal element 18 which depends within the bucket and has the other end thereof clamped between the bushing 12 and the head 19 of a hollow stud 20 threaded in said bushing. The thermal element is preferably of such character and so arranged that hot water or steam expands said element to cause valve 15 to engage its seat but temperatures lower than the usual working temperature will contract said element and unseat valve 15.

In operation the hot water and steam entering the trap will seat valve 15 and the trap will function in the usual manner as previously described. If, however, air enters the trap and causes binding so that neither hot water nor steam can enter, then the temperature within the trap will fall and thermal element will contract thereby unseating valve 15. This permits water to enter the bucket in sufficient quantity to cause it to sink and unseat valve 8 whereupon the trap is restored to normal operation. The steam and hot water entering the trap closes valve 15 as before.

Having thus described my invention, what I claim is:

1. In a fluid trap, the combination of a valve controlling the discharge opening of said trap, and thermostatically controlled means for automatically opening said valve when binding occurs in said trap.

2. In a fluid trap, the combination of a bucket having an operative connection with the discharge valve of said trap, and thermostatically controlled means for automatically sinking said bucket when binding occurs in said trap.

3. In a fluid trap, the combination of a bucket having an operative connection with the discharge valve of said trap, and a thermostatically controlled valve positioned in said bucket and adapted to establish communication between said bucket and the body of said trap below the normal water level.

4. In a fluid trap, the combination with a bucket having an operative connection with the discharge valve of said trap, of a bushing fitted into said bucket below the normal water level in the body of said trap, said bushing having a seat thereon, a valve adapted to cooperate with said seat to close said bushing, and a thermal element connected with and adapted to open and close said valve.

5. In a fluid trap, the combination with a buoyant member operatively connected with the discharge valve of the trap, a valve positioned in said buoyant member and adapted to establish communication between said member and the body of said trap below the normal liquid level therein, and means for automatically opening said last mentioned valve when binding occurs in said trap.

In testimony whereof, I hereunto affix my signature.

JOHN P. LIPPERT.